US012730705B2

(12) United States Patent
Mathur et al.

(10) Patent No.: US 12,730,705 B2
(45) Date of Patent: Sep. 8, 2026

(54) USER INTERFACE ACTION TRACKING FOR QUALITY EVALUATION OF AI-GENERATED CONTENT

(71) Applicant: Microsoft Technology Licensing, LLC, Redmond, WA (US)

(72) Inventors: Kartik Mathur, Seattle, WA (US); Julia Weronika Adamczyk, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 72 days.

(21) Appl. No.: 18/822,562

(22) Filed: Sep. 3, 2024

(65) Prior Publication Data

US 2026/0064521 A1 Mar. 5, 2026

(51) Int. Cl.
*G06F 11/00* (2006.01)
*G06F 11/07* (2006.01)

(52) U.S. Cl.
CPC ...... *G06F 11/0793* (2013.01); *G06F 11/0769* (2013.01)

(58) Field of Classification Search
CPC ............. G06F 11/0793; G06F 11/0769; G06N 3/00–10; G06N 3/08
USPC ........................................................ 714/1–57
See application file for complete search history.

(56) References Cited

U.S. PATENT DOCUMENTS

2019/0324778 A1* 10/2019 Bhowmick ............. G06F 9/453
2024/0143425 A1* 5/2024 Porter .................. G05B 23/024
2024/0176630 A1* 5/2024 Timmons ................ G06F 9/453
2024/0303473 A1* 9/2024 Cheng ..................... G06N 3/045
2025/0231841 A1* 7/2025 Thompson .......... G06F 11/1469
2025/0278555 A1* 9/2025 Kumbhar ................ G06F 40/40

OTHER PUBLICATIONS

"Get started with prompt flow to develop Large Language Model (LLM) apps", accessed on link https://learn.microsoft.com/en-us/training/modules/get-started-prompt-flow/1-introduction, 2024, 18 pages.
"LLM Evaluation: Metrics and Benchmarking Performance", accessed on link https://aisera.com/blog/llm-evaluation/, 2024, 1 page.
Extended European search report received for European Application No. 25199161.8, mailed on Jan. 14, 2026, 10 pages.

* cited by examiner

*Primary Examiner* — Sarai E Butler
(74) *Attorney, Agent, or Firm* — Holzer Patel Drennan

(57) ABSTRACT

A method of AI content evaluation includes receiving, from a generative artificial intelligence (AI) model, a set of AI-generated instructions that identifies steps for performing a task within an application, and selecting checkpoint interactions from an interaction index that define a plurality of interactions with a user interface. Each of the checkpoint interactions satisfies a similarity metric with a corresponding step in the set of AI-generated instructions. The method further includes determining, based on detected user interactions with the user interface, a subset of the checkpoint interactions completed by a user within an observation period, and evaluating a metric that to compute a quality score that quantifies user success with respect to performing the task associated with the AI-generated instructions. The metric depending at least in part on the subset of the checkpoint interactions completed by the user within the observation period. In response to determining that the quality score satisfies low-quality criteria, a remedial action is performed.

20 Claims, 5 Drawing Sheets

Receive, from a generative artificial intelligence (AI) model, a set of AI-generated instructions that identifies steps for performing a task within an application — 302

Select checkpoint interactions from an interaction index that identifies a plurality of interactions with a user interface of the application, each of the checkpoint interactions satisfying a similarity metric with a corresponding step in the set of AI-generated instructions — 304

Determine, based on detected user interactions with the user interface, a subset of the checkpoint interactions completed by a user within an observation period — 306

Evaluate a metric to derive a quality score, the metric depending on the subset of the checkpoint interactions completed by the user within the observation period — 308

Does the quality score satisfy low-quality critiera? — 310

End — 314

Perform or initiate a remedial action — 312

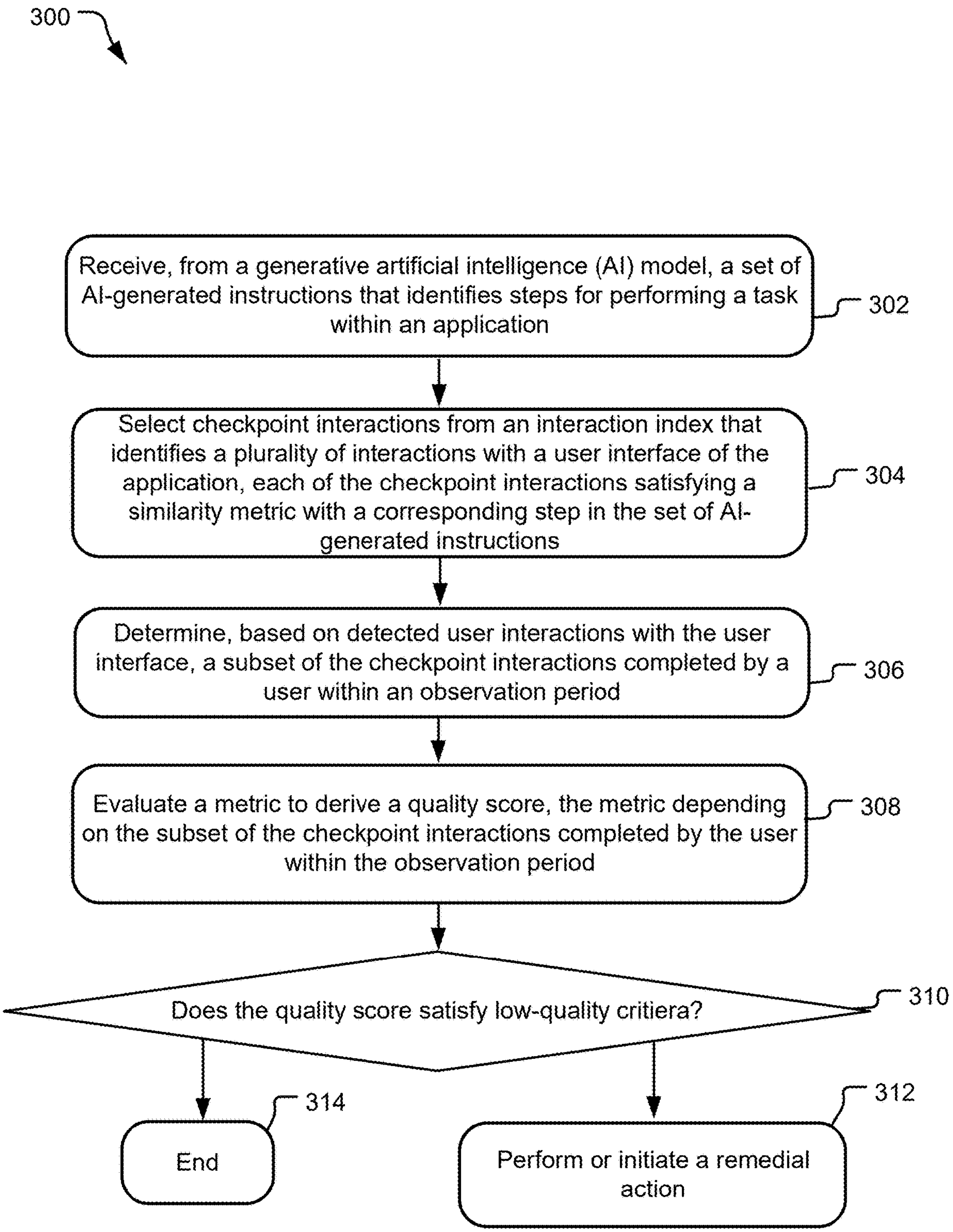

FIG. 3

USER INTERFACE ACTION TRACKING FOR QUALITY EVALUATION OF AI-GENERATED CONTENT

BACKGROUND

In the modern era, generative artificial intelligence (AI) replaces human assistants in various user-support tasks. Various web-based platforms employ AI-backed chatbots as a primary mechanism for service assistance, account assistance, technical assistance, etc. In these and other scenarios, AI is used to compose help content served to end users, often without first being reviewed by a human administrator. For example, an application may include a help search bar that accepts natural language inputs. The application may pass inputs typed into the help search bar to a large language model (LLM) or other trained (e.g., specialized, smaller-scale) model that, in turn, dynamically generates content that is presented by the application in response to the user query.

While AI can be effective in some of these scenarios, it is challenging for an application or service provider to evaluate how well these generative AI help tools work in different use scenarios. Few, if any, metadata systems facilitate meaningful evaluation of AI-generated content, making it difficult for service providers to improve services that heavily rely on generative AI tools.

SUMMARY

According to one implementation, a method evaluating AI-generated content includes receiving, from a generative artificial intelligence (AI) model, a set of AI-generated instructions that identifies steps for performing a task within an application and selecting checkpoint interactions from an interaction index that defines a plurality of interactions with a user interface of an application. Each checkpoint interaction satisfies a similarity metric with a corresponding step in the set of AI-generated instructions. The method further includes determining, based on detected user interactions with a user interface of the application, a subset of the checkpoint interactions completed by a user within an observation period and evaluating a metric that quantifies user success with respect to performing the task. The metric depends on the subset of the checkpoint interactions completed by the user within the observation period. The method further provides for generating and transmitting a quality alert in response to determining that the metric satisfies low-quality criteria. In one implementation, the quality alert includes the set of AI-generated instructions and an input query used by the generative AI model as a basis for generating the AI-generated instructions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 3 illustrates examples of operations for tracking user interactions with a user interface and using the tracked user actions to evaluate the quality of a set of AI-generated instructions.

DETAILED DESCRIPTION

Figure 1:
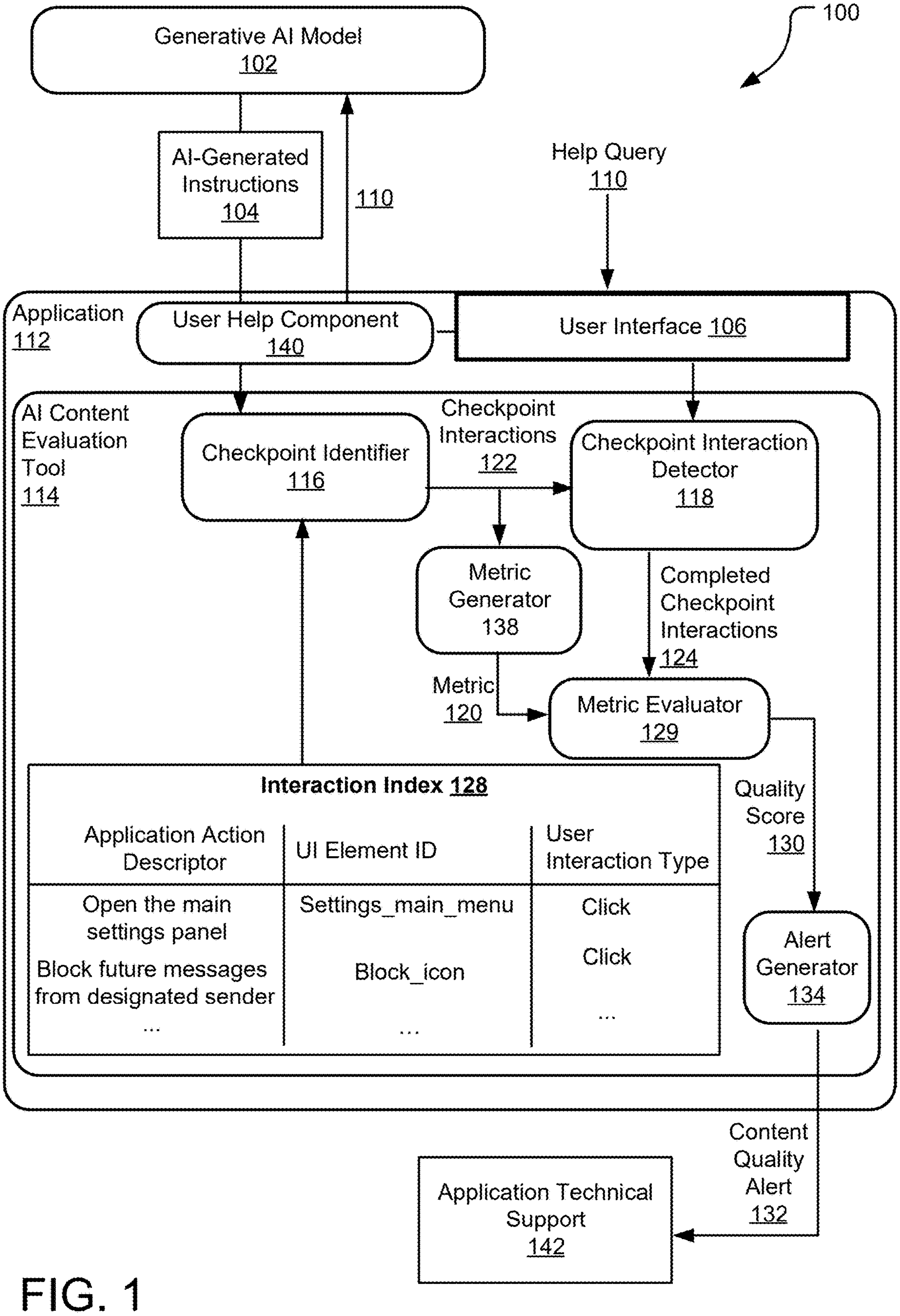
FIG. 1 illustrates a system that uses an example content evaluation tool to dynamically evaluate the quality of AI-generated help content presented by or within an application.

The herein-disclosed technology includes a generative AI content evaluation tool that makes it possible to objectively evaluate the quality of AI-generated content in terms of its helpfulness to end users across many topics. According to one implementation, the generative AI content evaluation tool is configured to dynamically assess the quality/helpfulness of AI-generated help content presented to a user by a user-facing software application. This dynamic assessment is automatic and can occur without user knowledge.

In one implementation, the disclosed AI content evaluation tool analyzes the textual subcomponents within an AI-generated response or document to determine a unique metric that can be subsequently computed, based on passively observed UI interactions, to score the AI-generated response or document in terms of its effectiveness at guiding a user to perform a specific task. Determining the unique metric includes identifying individual steps (e.g., individual directives) within a set of AI-generated instructions and matching select individual steps to a corresponding UI interaction that, if detected, indicates successful user achievement of the associated step. In some implementations, determining the metric further includes weighting or ranking individual steps in a set of AI-generated instructions in terms of how strongly the success or failure of the overall AI-guided task correlates with successful user completion of each different individual step. This weighting or ranking of the steps for a given set of AI-generated instructions is then factored into the unique metric computed to evaluate the quality of the AI-generated instructions.

In different implementations, quality metrics computed by the herein-disclosed AI content evaluation tool facilitate different types of remedial actions that improve the quality and/or helpfulness of AI-generated help content, such as by automatically flagging topics/subjects that a generative AI model is inadequately trained on. In some implementations, automated flagging is used to guide targeted training to improve the generative AI model. In still other implementations, the above-described automated flagging of topics/subjects makes it possible for an administrator to deliberately disable an application's use of a generative AI help tool with respect to certain help topics. If, for example, it is determined that a particular generative AI tool performs poorly when answering questions about a particular topic or task, a help support team may configure an application to present relevant human-generated help content instead of prompting the AI model to answer user queries about the topic or task.

In still other scenarios, the herein-disclosed techniques for evaluating the quality of AI-generated content can facilitate targeted improvements to software applications that utilize the generative AI help tool. If, for example, computed quality metrics indicate that users are repeatedly seeking help to perform a particular task within an application and struggling to perform that task correctly (e.g., users are unable to follow AI-generated instructions), a technical support team may elect to modify a UI of the application to make it easier for the user to perform the task, such as by making it easier to find certain menu options. In yet another implementation, the generative AI model is trained via reinforcement learning, and outputs of the here-disclosed content evaluation tool are fed back into the model in the form of negative or positive feedback.

FIG. 1 illustrates a system 100 that uses an AI content evaluation tool 114 to dynamically evaluate the quality of AI-generated help content presented by or within an application 112 based, at least in part, on user interactions with UI elements of the application 112. The application 112 is a user-facing application that is configured to collect user inputs through one or many different user interfaces (e.g., a user interface 106) and is either locally executed by a processor of a user device (not shown) that presents the user interface 106 or executed remotely from such device, such as via a web-based application server that transmits content to a user device for presentation on a user display. The application 112 may be any type of application including, for example, document composition, email, messaging, web conferencing, task organization, time management (e.g., a calendar app), media editing and/or playback (viewing), web browsing, photo editing, and more.

The application 112 includes a user help component 140 backed by a generative AI model 102. The user help component 140 is, for example, a software component of the application that is designed to select and present help resource content to a user in response to receipt of user inputs (e.g., a help query 110) that a user provides to an interactive element of a user interface 106, such as a help search bar or chatbot. The user help component 140 is configured to convey some or all user-initiated help queries to the generative AI model 102 and present, to a user display (not shown), corresponding outputs of the generative AI model 102. In some implementations, the user help component 140 is also configured to access a library of help resources and selectively present documents or media files from the library that are identified as relevant to a user query. For example, the user help component 140 may be configured to selectively delegate some user queries to the generative AI model 102 and to respond to other user queries by selecting and presenting relevant pre-composed library resource(s).

In FIG. 1, the user interface 106 is shown receiving a help query 110, which can be understood as an input to the application 112, e.g., provided by an end user, that identifies a topic or subject of interest. In one implementation, the topic or subject of the help query 110 identifies a particular task that the user wants to perform within the application 112. For example, the user may be trying to figure out how to insert a table into a document, change a format detail of the document, alter a language or display setting of the application, or perform any other task that can be initiated and/or completed by interacting with UI elements of the application 112. The user help component 140 conveys the help query 110 to the generative AI model 102.

The generative AI model 102 may be any type of generative AI model, such as a transformer-based model (e.g., a generative pre-trained transformer (GPT) model or a sequential model), a diffusion model, a flow-based model, or a recurrent neural network (RNN)). The generative AI model 102 may be an off-the-shelf large language model (LLM), such as GPT-3 or GPT-4 or a specially-purposed version thereof with training focused on topics and tasks pertaining to the application 112. As used herein, the term LLM is used to refer to a class of trained models that process and generate text (e.g., letters, numbers, symbols). While this class of trained models includes natural language processing (NLP) models, it also includes multimodal models that can receive prompts that include various types of input (e.g., text, image, audio, and/or video data) and likewise generate outputs of various types that are not necessarily the same as the input type. In some implementations, the AI-generated instructions 104 include images, audio, and/or video generated by the generative AI model 102.

The generative AI model 102 receives the help query 110, processes the help query 110, and outputs AI-generated instructions 104 in response. The AI-generated instructions 104 can be understood as AI-generated content of one or more media forms (e.g., text, image, audio, and/or video) that includes one or more steps (e.g., directives) that the user is to follow, such as by interacting with various user interface elements of the application, to accomplish the particular task that the user wants to perform. For example, the user may ask, "How do I insert an image saved to my clipboard?" and the AI-generated instructions 104 includes a series of steps that the user can follow (provided the instructions are correct) to cause the application 112 to insert an image that the user has saved on a clipboard into an open document. For example, the AI-generated instructions 104 include a list of textual steps that instruct the user on where to find relevant UI components on the user interface 106 and how to interact with such components.

In response to receiving the AI-generated instructions 104 from the generative AI model 102, the user help component 140 presents the AI-generated instructions 104 on the user interface 106 and additionally passes the AI-generated instructions 104 to the AI content evaluation tool 114. Within the AI content evaluation tool 114, the AI-generated instructions 104 are first processed by a checkpoint identifier 116, which is either an algorithm or trained model that parses AI-generated instructions 104 to identify individual steps (e.g., individual directives) within the set of AI-generated instructions 104. Additionally, the checkpoint identifier 116 matches some or all of those individual steps to corresponding, predefined UI interactions—referred to herein as "checkpoint interactions 122"—that, if detected, serve to indicate that the user successfully completed the corresponding step. During this matching operation, the checkpoint identifier 116 compares each step in the instructions to a plurality of predefined UI interactions, shown in interaction index 128, that are each characterized by a user interaction with a UI element on the user interface 105.

In the example of FIG. 1, the interaction index 128 includes a table with rows corresponding to different detectable user interactions with the user interface 105 that each causes the application 112 to perform a different action or function. Each entry (interaction) in the interaction index 128 is characterized by a UI element identifier that uniquely identifies a UI element on the user interface 106, a user interaction type (e.g., input type identifier), and a description of an action that is performed by the application 112 in response to detecting an interaction of the specified user interaction type with the UI element corresponding to the UI element identifier. For example, the first interaction in the interaction index 128 includes the application action descriptor "open the main settings panel," a unique identifier corresponding to a UI element of the application that the user can interact with to open the main settings panel, and a description of the input type that is to be provided to the UI element (e.g., a click) in order to cause the application to perform the action described in the application action description.

In one implementation, the checkpoint identifier 116 computes a similarity metric between each "step" in the AI-generated instructions 104 and each interaction listed in the interaction index 128. For example, each individual step in the AI-generated instructions 104 is vectorized and compared to a vectorized representation of each different interaction represented within the interaction index 128. This vector comparison may, for example, include computing a similarity metric (e.g., cosine similarity or dot product) for each pair of vectors and selecting the interaction from the interaction index 128 for which the computed metric is indicative of the highest degree of similarity. This interaction from the interaction index 128 that is selected as a "best match" for a corresponding step in the AI-generated instructions 104 is referred to herein as the "checkpoint interaction" for that step. When the checkpoint interaction is detected for a given step in the AI-generated instructions 104, the step is treated as having been successfully completed by the end user.

In some cases, the checkpoint identifier 116 may include logic that requires all checkpoint actions to be characterized by at least a threshold level of similarity to the corresponding step of the AI-generated instructions 104. For example, certain step(s) within the AI-generated instructions 104 may exist that are not characterized by the threshold level of similarity with any of the interactions listed in the interaction index 128. These steps are not assigned a corresponding checkpoint identifier and are, in some implementations, discarded with respect to all further processing operations of AI content evaluation tool 114 (meaning these steps cannot be evaluated for quality/accuracy).

Notably, the below-described processing operations of the AI content evaluation tool 114 pertain to deriving and computing a metric 120 that is usable to quantify how successful the user was when following the AI-generated instructions 104 to complete the associated task. The metric 120 is, therefore, a measurement of both user success and instruction quality. When the AI-generated instructions are of high quality, the user is more likely to be successful at completing each step and the overall task that the steps contribute to.

Once identified as described above, the checkpoint interactions 122 for the AI-generated instructions 104 are passed to a metric generator 138 and to a checkpoint interaction detector 118. The checkpoint interaction detector 118 runs in real-time while the user reviews the AI-generated instructions 104 and begins to "follow" the steps laid out in the instructions. In one implementation, the checkpoint interaction detector 118 records interaction metadata that includes some or all input that the user provides to the application during an observation period following the initial presentation of the AI-generated instructions 104. For example, the recorded interaction metadata identifies each UI element of the user interface 106 that the user interacts with, the inputs detected (e.g., whether the user clicked on the element, hovered over it, typed text into it), and timestamp data that characterized when each different input was received/detected. In one implementation, the metadata is captured in a logfile (not shown) that may be reviewed and/or automatically processed as part of a subsequent investigation (e.g., of an application service provider) to determine why a content quality alert 132 was generated for the AI-generated instructions 104, as is discussed further below.

In addition to recording interaction metadata that includes the above-described user inputs to the user interface 106, the checkpoint interaction detector 118 executes logic to detect the checkpoint interactions 122 and ultimately outputs a subset of these checkpoint interactions 122 that the user completed (shown in FIG. 1 as "completed checkpoint interactions 124").

The metric generator 138 generates a metric (the metric 120) that is based on the completed checkpoint interactions 124. The metric 120 is, for example, an equation that includes terms corresponding to the checkpoint interactions 122 with values that depend on whether the user completed each of the checkpoint interactions 122. The metric 120 can be understood as quantifying user success and, in direct correlation with user success, the quality of the AI-generated instructions 104 (e.g., in terms of correctly describing the steps needed to complete the associated task and clarifying each step).

In various implementations, the metric 120 is computed in different ways. In an implementation that takes a rudimentary approach, each different one of the checkpoint interactions 122 is assigned equal weight toward a maximum total "completion score," and the metric 120 is used to complete the completion score. If, for example, the checkpoint identifier 116 identifies two different checkpoint interactions for the AI-generated instructions, the metric may provide a score of 50/100 when a single one of the checkpoint interactions 122 is detected and for a score of 100/100 when both of the checkpoint interactions 122 are detected.

In other implementations, the metric generator 138 employs logic to assign weights to the checkpoint interactions 122 that are factored into the metric 120. For example, the weights may be selected as an indicator of the importance of each step with respect to the success of the overall task. If, for example, a task includes eight checkpoint interactions and a user completes the first consecutive 6 or 7 of them, it may be that the user simply aborted the task but had no problem following the AI-generated instructions 104. Thus, the last step or few steps may, in some implementations, be assigned a lesser weight than earlier, more important steps (meaning that the lesser weight steps would have less of an impact on the quality score 130).

Once determined, the metric 120 is passed to a metric evaluator 129 that receives outputs from the checkpoint interaction detector 118, including outputs that identify completed checkpoint interactions 124 (e.g., a subset of the checkpoint interactions 122 that the user completed successfully). The metric evaluator 129 evaluates the metric 120 based on the completed checkpoint interactions 124 and outputs a quality score of 130. The quality score 130 quantifies user success at performing the associated task (e.g., the user was 90% or 20% successful) and also—by correlation—quantifies the quality of the AI-generated instructions 104.

The quality score 130 is provided to an alert generator 134, which is configured to conditionally generate a content quality alert 132 at times when the quality score 130 satisfies low-quality criteria (e.g., the score is below a threshold such as 75% or otherwise indicative of a user's failure—or near failure—to complete the task associated with the AI-generated instructions). In one implementation, the content quality alert 132 includes information that can be used (e.g., by a human or automated process) to investigate the most likely reason(s) for the low-quality score. For example, the content quality alert 132 includes the help query 110, the AI-generated instructions 104, and the interaction metadata that is recorded by the checkpoint interaction detector 118 during the evaluation of the AI-generated instructions 104 (e.g., the metadata that indicates which actions the user performed with respect to the user interface 106 while trying to follow the AI-generated instructions 104).

In various implementations, the content quality alert 132 is processed in different ways, e.g., as a trigger for different remedial actions that improve one or more of the generative AI model 102, the user interface 106, and/or the help resources that are accessible through the user interface 106—all of which may be effective to increase a user success rate associated with performing the task that is guided by the AI-generated instructions 104.

In FIG. 1, the content quality alert 132 is shown as being provided to application technical support 142, such as an automated process that provides technical support functionality or an inbox monitored by a technician or support team tasked with improving the quality of help resources available within the application 112. Upon receiving the content quality alert 132, the application technical support 142 may review the contents of the content quality alert 132 and flag the task associated with the AI-generated instructions 104 as relating to a topic area of interest for which the generative AI model 102 is insufficiently trained. Subsequently, this information may be used to inform supplemental, targeted training that expands the corpus of training data available to the generative AI model 102 and thereby improves the quality of model-generated responses pertaining to the topic area (and task) of interest. This, in turn, improves the user success rate with respect to performing the task associated with the set of AI-generated instructions 104.

In other implementations, a human support technician may review data included within the content quality alert 132 (e.g., the help query 110 and the AI-generated instructions 104) and determine that there are no obvious errors in the AI-generated instructions 104. In this case, investigative efforts may be commenced to determine other factors contributing to the low value of the quality score 130, such as shortcomings of the user interface 106 that make it difficult or confusing for the user to find certain UI elements identified within the AI-generated instructions 104. In some cases, data within the content quality alert 132 is automatically or manually aggregated with data from other similarly-generated alerts that pertain to the same or very similar topics (e.g., the same support task). If such data indicates that (1) many users are struggling to perform a particular task and also (2) the corresponding set of AI-generated instructions 104 are correct, then a support technician may recommend or implement changes to the user interface 106 to make it easier to find and/or interact with UI element(s) referenced by the AI-generated instructions 104.

In still other implementations, the generative AI model 102 is trained via a reinforcement learning technique and receives negative feedback in response to each content quality alert that is generated (e.g., each time the quality score falls below a threshold). In this implementation, the generative AI model 102 self-adjusts its respective weights to gradually improve model performance with respect to the tasks/topics corresponding to the negative feedback.

Figure 2A:
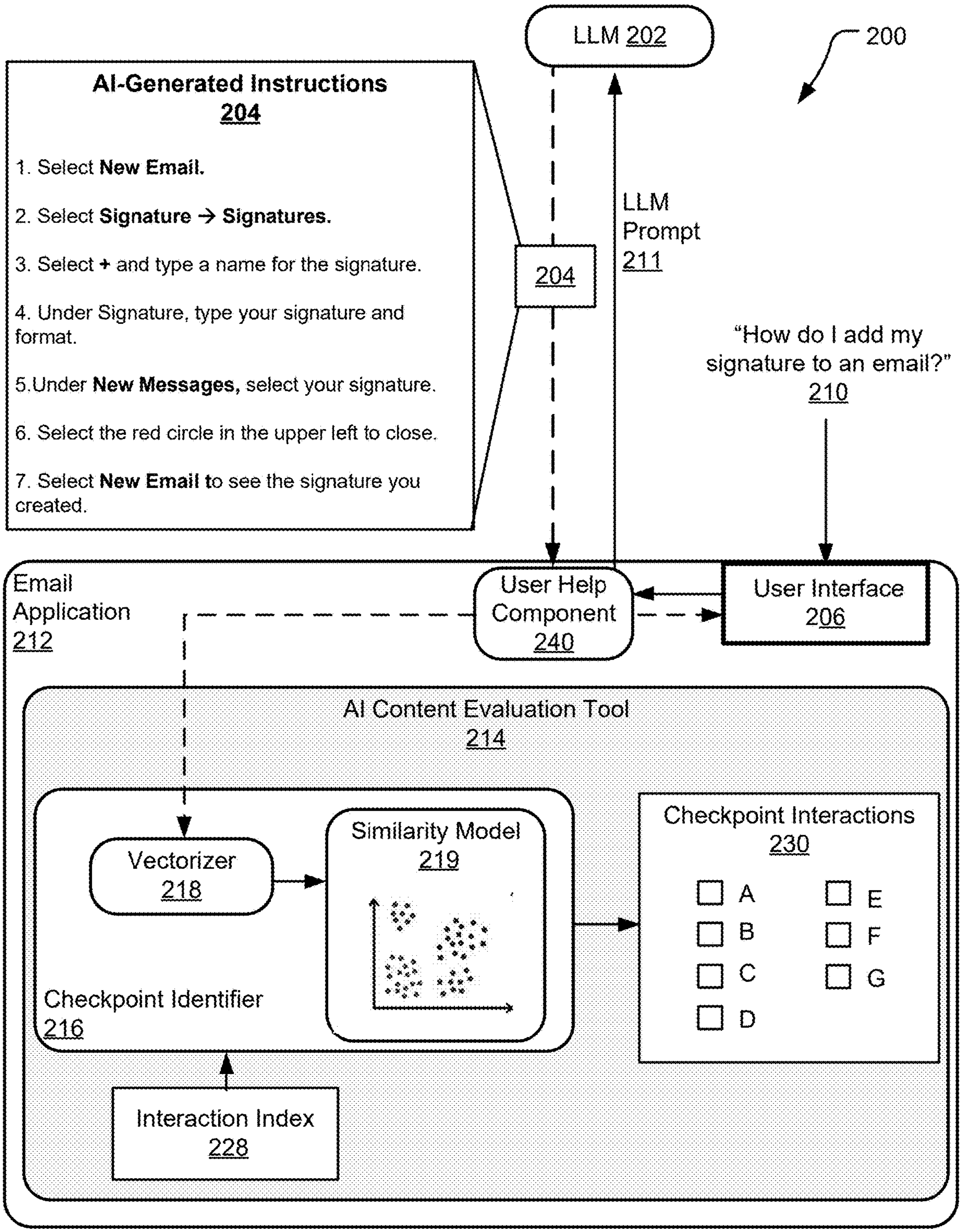
FIG. 2A illustrates an example system that tracks user interactions with a user interface to evaluate the quality of a set of AI-generated instructions.
Figure 2B:
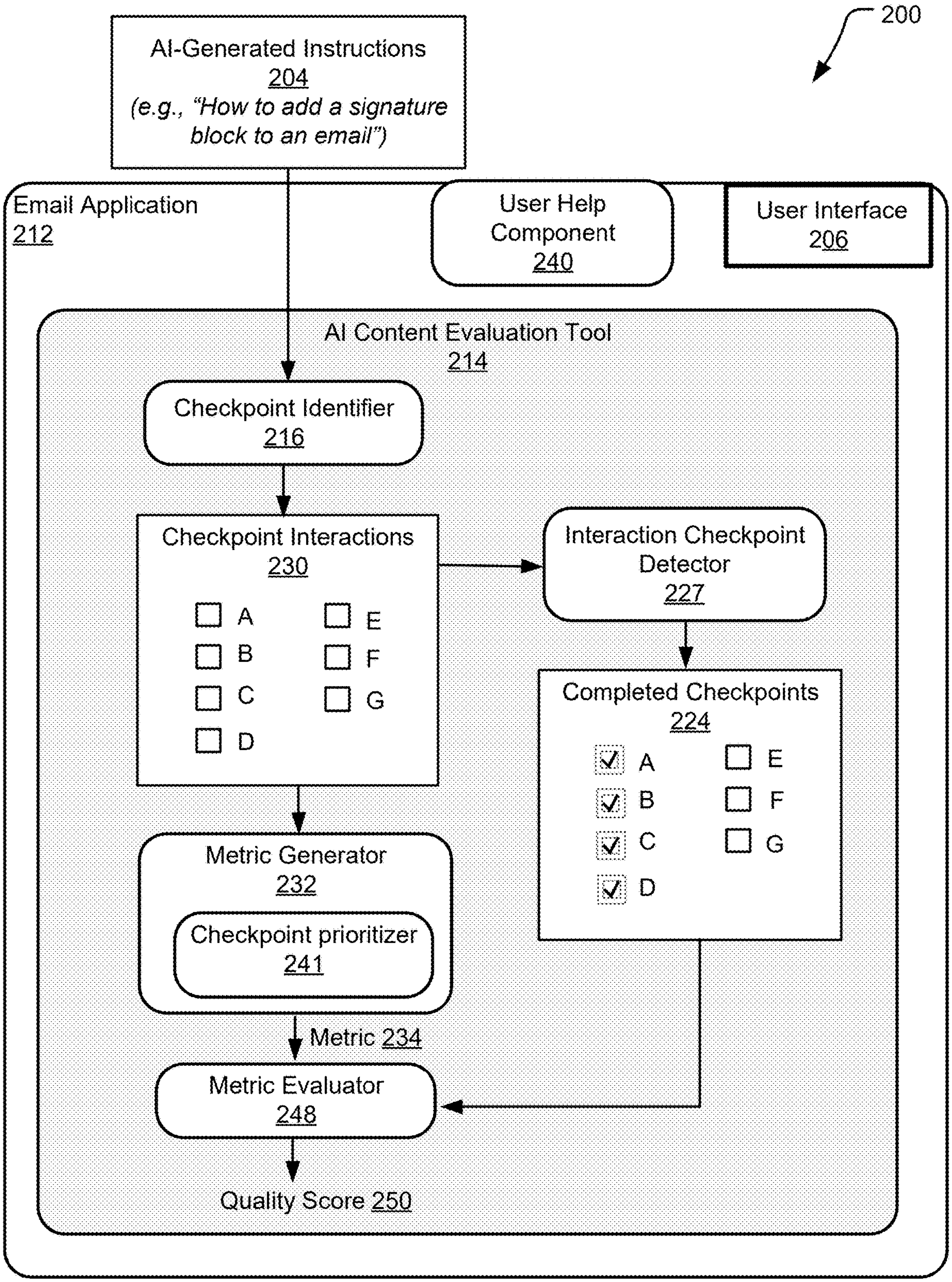
FIG. 2B illustrates additional aspects of the system that are shown and described with respect to FIG. 2A.

FIG. 2A illustrates an example system 200 that tracks user interactions with a user interface 206 to evaluate the quality of a set of AI-generated instructions 204. Aspects of the system 200 are not specifically described with respect to FIG. 2A or 2B may be understood as being the same or similar to like-named to the system of FIG. 1. In FIG. 2, an AI content evaluation tool 214 is shown implemented within an email application. The email application 212 includes a user interface 206 that passes at least some user inputs (e.g., help queries) to a user help component 240. For example, the user interface 206 includes a search bar (not shown) associated with a help function of the email application 212. When a user type a query 210 into the search bar (e.g., "How do I add my signature to an email"), the user help component 240 generates LLM prompt 211 that conveys the query 210 to an LLM 202 (e.g., a generative AI model). In some implementations, the LLM prompt 211 includes the query 210 verbatim; in other implementations, the LLM prompt 211 includes a rephrased or context-enhanced version of the query 210. For example, the user help component 240 may perform some processing to rephrase or reform the query 210 for clarity and/or add other information to the query to help the LLM 202 generate a suitable response. In one implementation, the LLM 202 executes on a web-based endpoint. In other implementations, the LLM 202 executes locally on the user device.

In response to receiving the LLM prompt 211, the LLM 202 processes the user query 210 and outputs AI-generated instructions 204. In the example shown, the AI-generated instructions 204 include seven different steps that the end user is to follow to add their signature to an email signature block within the email application 212. The AI-generated instructions 204 are returned to the user help component 240 and presented on the user interface 206. Additionally, the AI-generated instructions 204 are input to the AI content evaluation tool 214. The AI content evaluation tool 214 is, in one implementation, a component of the email application 212. In other implementations, the AI content evaluation tool 214 is a separate application that runs independently of the email application 212. For example, the AI content evaluation tool 214 is another local application on the same user device or a cloud-based application.

Within the AI content evaluation tool 214, the AI-generated instructions 204 are provided to a checkpoint identifier 216. The checkpoint identifier 216 includes a vectorizer 218 configured to vectorize various text strings into a common vector space in which separation between pairs of vectors is indicative of a learned degree of similarity between the corresponding text strings. In addition to the vectorizer 218, the checkpoint identifier 216 includes a similarity model 219, which includes a collection of stored vectors output by the vectorizer 218 that are all defined within the common vector space.

Each vector shown (e.g., as a dot) in the similarity model 219 can be understood as being a vector, output by the vectorizer 218, that corresponds to a user interaction defined within a pre-populated (e.g., administrator-designed) interaction index 228. The interaction index 228 includes some or all information described with respect to the interaction index of FIG. 1. In one implementation, each entry (interaction) in the interaction index 228 includes (1) a UI element identifier that uniquely identifies a UI element on the user interface 206 and (2) a description of a software-implemented function or action that is conditionally performed (e.g., by the email application) in response to detecting a user interaction with the specified UI element. In some implementations, each interaction in the interaction index 228 additionally identifies a specific type of user input (e.g., text, mouse click) that the user is to perform on the UI element to cause the application to perform the corresponding action or function.

Prior to receipt of the AI-generated instructions 204, the vectorizer 218 has vectorized each entry (interaction) defined within the interaction index 228 and added these vectors to the similarity model 219. Upon receiving the AI-generated instructions 204, the vectorizer 218 also vectorizes a text string included within each different step of the AI-generated instructions (e.g., steps 1-7). The result of this vectorization is, in the present example, seven vectors corresponding to the seven steps in the AI-generated instructions 204. The checkpoint identifier 216 computes a similarity metric (e.g., a dot product or cosine similarity) between each of these seven vectorized steps of the AI-generated instructions 204 and each different vectorized interaction from the interaction index 228. For example, a dot product is computed between a vectorized representation of Step 1 ("Select New Email") and the vectorized representation of each different interaction in the interaction index 228. In this way, the checkpoint identifier 216 attempts to identify, for each of the different steps (1-7), an interaction defined within the interaction index 228 that is "most similar" to the step. The checkpoint identifier 216 then further determines, for each step (1-7), whether the corresponding "most similar" interaction is "similar enough" to the corresponding step to be used as a metric for evaluating user success or failure with respect to the performance of the corresponding step. This assessment entails evaluating "similarity criteria," which is herein used to refer to one or more criteria used collectively to evaluate the similarity between vectors. In one implementation, an interaction and step are determined to satisfy the similarity criteria when the computed dot product of the corresponding vectors exceeds a threshold.

When the checkpoint identifier 216 identifies an interaction from the interaction index 228 that satisfies the similarity criteria with a given step of the AI-generated instructions 204, the interaction is selected to serve as the "checkpoint interaction" for that step. Notably, there may exist scenarios where the checkpoint identifier 216 is unable to identify a suitable checkpoint interaction for one or more steps within the AI-generated instructions 204.

In another implementation, the checkpoint identifier 216 outputs, for each different step (1-7) in the AI-Generated instructions 204, a subset of candidate UI interactions from the interaction index 228 that satisfy a predefined similarity metric with the step. Following this, an LLM (e.g., the LLM 202 or another LLM) is tasked with selecting the most relevant interaction from the subset of candidate UI interactions. Assume, for example, that the checkpoint identifier 216 identifies three candidate UI interactions similar to step 1: "Select Signature." For instance, the interaction index 228 may identify UI interactions documented in the interaction index 228 that respectively facilitate the insertion of different types of signatures (e.g., into different documents, potentially within different applications that all collectively use the interaction index 228). In this scenario, the accuracy of checkpoint selection can be improved by using a retrieval augmented generation (RAG) assistant to engineer an LLM prompt that includes (1) the three candidate UI interactions; (2) contextual data pertaining to each of the three candidate UI interactions that are mined from various sources; and (3) a directive instructing the LLM to identify which of the three candidate interactions is most relevant to the AI-generated step. This methodology leverages the LLM's understanding of natural language to select the "best" checkpoint identifier based on natural language inferences, which tends to improve the accuracy of the selected checkpoint interactions 230 as compared to methods that exclusively utilize the vectorizer 218 to select the checkpoint interaction 230 that corresponds to each of the AI-generated steps.

In some implementations, the AI-generated instructions 204 include image and/or video content. The checkpoint identifier 216 is configured to resolve this content to corresponding textual descriptions that can then be compared to the interactions in the interaction index. In one implementation, the checkpoint identifier 216 provides images and/or video content included within the AI-generated instructions 204 to a multimodal LLM that is trained to translate image and/or video content to text. For example, the multimodal LLM is trained to receive an image as input and output a description of the image. The output of this multimodal LLM is then vectorized (either alone or in combination with text that is also present in the AI-generated instructions) and compared to the vectorized interactions in the similarity model 219 to identify a corresponding checkpoint interaction, as generally described above.

The checkpoint identifier 216 outputs a complete listing of identified checkpoint interactions 230 for the AI-generated instructions 204. In the example shown, the checkpoint interactions 230 include seven different UI interactions (e.g., A-G) defined within the interaction index 228, and each individual interaction (A-G) is the checkpoint interaction (e.g., success benchmark) for a corresponding one of the steps (1-7) in the AI-generated instructions. Further operations within the system 200 are discussed with respect to FIG. 2B.

FIG. 2B illustrates additional aspects of the AI content evaluation tool 214 that is implemented within the system 200 shown and described above with respect to FIG. 2A. After the checkpoint identifier 216 identifies the checkpoint interactions 230 for the set of AI-generated instructions 204 (e.g., as discussed with respect to FIG. 2A), the checkpoint interactions 230 are provided to a metric generator 232 that determines a metric 234, based on the checkpoint interactions 230, that is computable to determine a quality score 250 for the AI-generated instructions 204.

In this implementation, the metric generator 232 includes a checkpoint prioritizer 241 that prioritizes or ranks the checkpoint interactions 230 using various criteria. The metric generator 232 then assigns weights based on the prioritization or ranking that affects the quality score 250 such that the more important/higher-ranked checkpoint interaction(s) have a greater impact on the quality score 250 than the less important/lower-ranked checkpoint interaction(s).

In one implementation, the above-described ranking/prioritization is performed by a machine learning model that is trained on interaction data collected for a large pool of users interacting with UI elements of an application (e.g., the email application 212) while performing different tasks. For example, the interaction data collected for a single user may indicate that the user interacted with 30 different UI elements in an observation period leading up to the user's interaction with a specific element that is known to accomplish a specific task-such as typing a signature into a template box within an "add email signature" control window. When this task-specific interaction data is collected across a large pool of users, the resulting dataset can be used to identify the probability of a user interacting with each of various UI elements just prior to interacting with a specific element that is representative of or closely associated with a given task.

According to one implementation, the checkpoint prioritizer 241 is trained on a dataset the same or similar to that above that includes a set of task-identifying interactions (e.g., UI interactions that are labeled in association with a specific task) and frequency counts that indicate whether and how often other UI elements were interacted with, e.g., across a pool of users, prior to detection of each task-identifying interaction. From this dataset, checkpoint prioritizer 241 is able to infer, for a given task, a set of UI elements that are most likely to be interacted with, as well as a specific probability of a user interacting with each UI element while carrying out the task.

Returning to the flow shown in FIG. 2, the checkpoint prioritizer 241 is provided with inputs that include (1) a description of the task associated with the AI-generated instructions 204 and (2) the set of checkpoint interactions 230. The checkpoint prioritizer 241 determines an interaction probability of each of the checkpoint interactions for the task and outputs data representative of these interaction probabilities. For example, the checkpoint prioritizer 241 outputs the checkpoint interactions 230 ranked in descending order of interaction probability—e.g., the first-ranked checkpoint interaction has the highest probability of being interacted with for a given task; the second-ranked checkpoint interaction has the next highest probability of being interacted with for the given task, and on so.

Based on the above-described ranking and prioritization of the checkpoint interactions, the checkpoint prioritizer 241 assigns a weight to each different one of the interaction checkpoints. This weight is, for each interaction checkpoint, indicative of the probability of a user interacting with the interaction checkpoint while performing the specified task (e.g., the task that is being guided by the AI-generated instructions 204). The checkpoint identifier 216 outputs a metric 234 that is based on these assigned weights and is usable for computing a quality score for the AI-generated instructions 204. For example, the metric 234 includes a term corresponding to each of the checkpoint interactions 230 multiplied by an assigned weight that is determined as described above. When the metric 234 is computed, each term is replaced with a value that depends on whether the associated checkpoint was completed. For example, a given term may be replaced with a "1" in scenarios where the given checkpoint is completed and a "0" in scenarios when the checkpoint is not completed, with the 1 and 0 terms each having an associated weight multiplier that affects the quality metric when the corresponding checkpoint interaction is detected.

The computation of the metrics 234 yields a quality score 250 that is highly indicative, per the above methodology, of whether or not the user interacted with the subset of elements that have the "highest interaction probability" for a given task. The quality metric 230 is most indicative of high-quality AI-generated instructions and user success when the user interacts with checkpoints that are known—per the training dataset—to be closely associated with the specified task.

An interaction checkpoint detector 227 monitors user actions within the email application 212 over an observation period to detect whether and when the user completes each of the checkpoint interactions 230. In one implementation, the observation period for a given set of checkpoint interactions 230 extends from the initial receipt of the checkpoint interactions at the interaction checkpoint detector 227 until the receipt of a new set of checkpoint interactions (e.g., pertaining to a new user help query). In another implementation, the observation period extends for a predefined time interval or until the email application 212 is closed.

At the termination of the observation period, the interaction checkpoint detector 227 outputs completed checkpoints 224, which identify a subset of the checkpoint interactions 230 that the user has performed. The completed checkpoints 224 are provided to a metric evaluator 248 along with the metric 234, and the metric evaluator 248 uses the completed checkpoints 224 to compute and output the quality score 250 for the AI-generated instructions 204. When the quality score 250 satisfies low-quality criteria (e.g., falls below a threshold or satisfies other criteria indicative of problems with the AI-generated instructions 204), a remedial action may be automatically executed or initiated, as generally described with respect to FIG. 1. For example, an alert may be generated and/or processed in a manner that triggers/drives targeted (human-led) retraining of the LLM 202 (shown in FIG. 2A) or in a manner that causes the LLM 202 to receive direct feedback (e.g., via reinforcement training), both of which lead to improvements the capability of the LLM 202 that ultimately increase a user success with respect to performing the task that is guided by the set of AI-generated instructions 204.

FIG. 3 illustrates example operations 300 for tracking user interactions with a user interface and for using the tracked user actions to evaluate the quality of a set of AI-generated instructions. A receiving operation 302 receives, from a generative AI model, a set of AI-generated instructions identifying steps for performing a task within an application. In one implementation, the AI-generated instructions are output by the generative AI model in response to a prompt that conveys, to the generative AI model, the substance of a user-help query. For example, the prompt includes the user help query verbatim or a modified version thereof that has been reformatted or reworded for clarity or other reasons.

A checkpoint selection operation 304 selects checkpoint interactions from an interaction index that defines a plurality of interactions with a user interface of the application. Each of the selected checkpoint interactions satisfies a similarity metric with a corresponding step in the set of AI-generate instructions.

A determining operation 306 determines, based on detected user interactions with the user interface, a subset of the user checkpoint interactions completed by a user within an observation period. For example, the observation period commences when the application presents the set of AI-generated instructions to the user, and the observation period terminates at a select time, such as after a predefined period of time has elapsed, at the time that the user closes the application, or at the time that the user performs some action that causes the application to present a different help resource or set of AI-generated instructions.

An evaluation operation 308 evaluates a metric to determine a quality score indicative of the quality of the AI-generated instructions. The metric depends upon the subset of the checkpoint interactions that were completed by the user within the observation period. In one implementation, the evaluation operation 308 yields a numeric value. A criteria evaluation operation 310 determines whether the quality score (e.g., the numeric value) satisfies pre-defined low-quality criteria, which are to be understood as one or more criteria that, when satisfied, tend to indicate that the quality of the AI-generated instructions is low and/or that the user has not succeeded at performing the task.

In response to determining that the quality score does satisfy the low-quality criteria, a remedial action operation 312 initiates or performs a remedial action that is effective in increasing user success at performing the task within the application in the future. For example, initiating the remedial action includes generating an alert for a technical support team, flagging the task associated with the AI-generated instructions and/or related subject areas as areas that the generative AI model requires more training in, automatically providing feedback to the generative AI model via a reinforcement training technique, or other remedial action discussed herein. In implementations that provide for transmitting an alert to a technical support team (e.g., a "content quality alert" as discussed with respect to FIG. 1), the alert may include information such as the user query that the generative AI model processed to generate the AI-generated instructions and interaction metadata describing the user's interactions with the user interface following presentation of the AI-generated instructions within the application.

In scenarios where the quality score does not satisfy the low-quality criteria, a termination block 314 terminates the operations 300.

Figure 4:
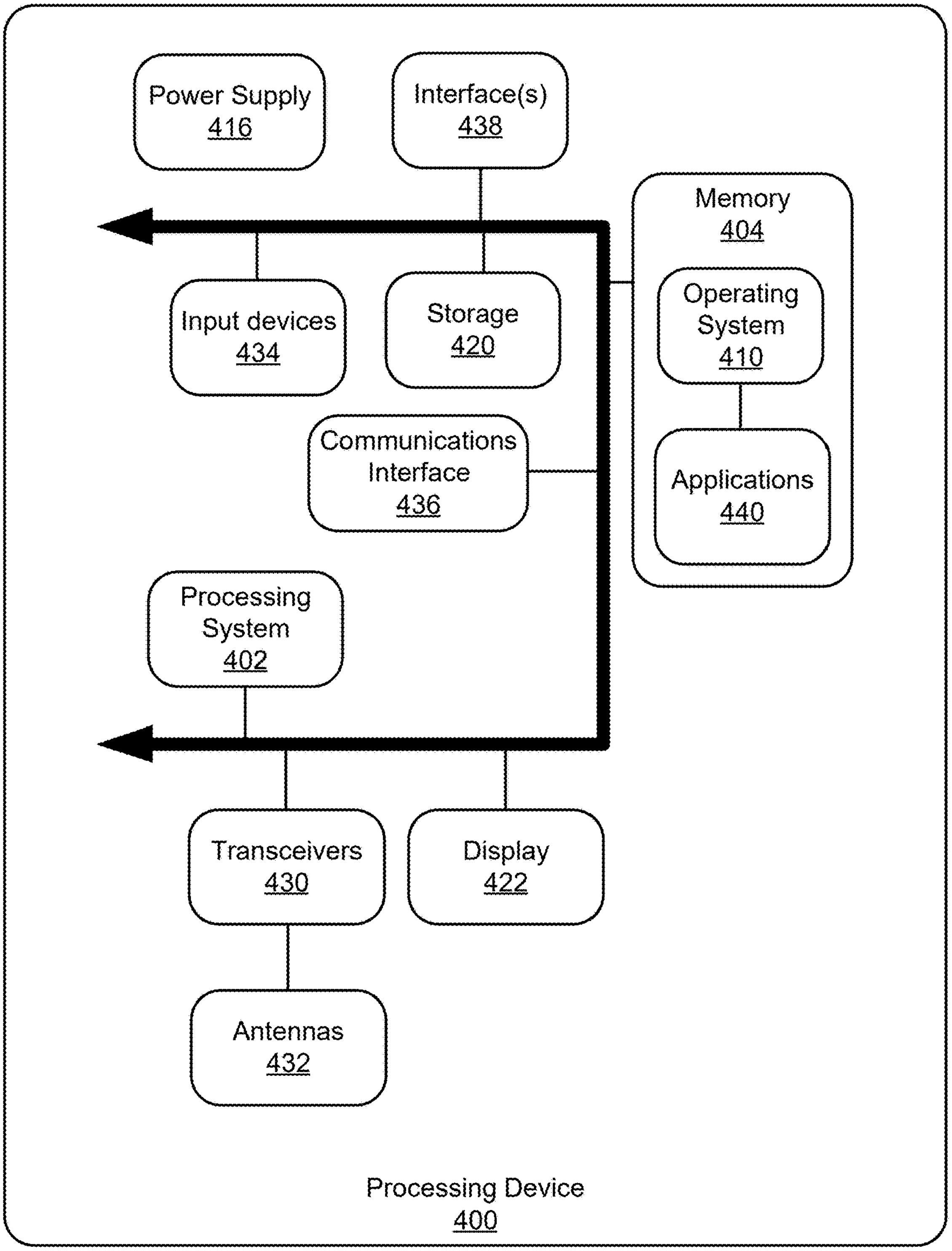
FIG. 4 illustrates an example schematic of a processing device suitable for implementing aspects of the disclosed technology.

FIG. 4 illustrates an example schematic of a processing device 400 suitable for implementing aspects of the disclosed technology. The processing device 400 includes a processing system 402, memory 404, a display 422, and other interfaces 438 (e.g., buttons). The processing system 402 may have one or more computer processing units (CPUs), graphics processing units (GPUs), etc.

The memory 404 generally includes both volatile memory (e.g., random access memory (RAM)) and non-volatile memory (e.g., flash memory). An operating system 410 resides in the memory 404 and is executed by the processing system 402. One or more applications 440 are loaded in the memory 404 and executed on the operating system 410 by the processing system 402 (e.g., application(s) that provide the functionality described with respect to the application 112 of FIG. 1 and/or the AI content evaluation tool 114 of FIG. 1). The applications 440 may receive inputs from one another as well as from various input local devices 434 such as a microphone, input accessory (e.g., keypad, mouse, stylus, touchpad, gamepad, racing wheel, joystick), or a camera.

Additionally, the application 440 may receive input from one or more remote devices, such as remotely-located servers or smart devices, by communicating with such devices over a wired or wireless network using more communication transceivers 430 and an antenna 432 to provide network connectivity (e.g., a mobile phone network, Wi-Fi®, Bluetooth®). The processing device 400 may also include one or more storage drives 420 (e.g., non-volatile storage), such as storage drives that include a root-of-trust configured to produce claims and attest to erase operations as generally described herein.

The processing device 400 further includes a power supply 416, which is powered by one or more batteries or other power sources and which provides power to other components of the processing device 400. The power supply 416 may also be connected to an external power source (not shown) that overrides or recharges the built-in batteries or other power sources.

The processing device 400 may include a variety of tangible computer-readable storage media and intangible computer-readable communication signals. Tangible computer-readable storage can be embodied by any available media that can be accessed by the processing device 400 and includes both volatile and nonvolatile storage media, removable and non-removable storage media. Tangible computer-readable storage media excludes intangible and transitory communications signals and includes volatile and nonvolatile, removable, and non-removable storage media implemented in any method or technology for storage of information such as computer-readable instructions, data structures, program modules, or other data. Tangible computer-readable storage media includes RAM, read-only memory (ROM), electrically erasable programmable read-only memory (EEPROM), flash memory or other memory technology, CDROM, digital versatile disks (DVD) or other optical disk storage, magnetic cassettes, magnetic tape, magnetic disk storage or other magnetic storage drives, or any other tangible medium which can be used to store the desired information, and which can be accessed by the processing device 400. In contrast to tangible computer-readable storage media, intangible computer-readable communication signals may embody computer-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. For example, intangible communication signals include wired media, such as a wired network or direct-wired connection, and wireless media, such as acoustic, radio frequency (RF), infrared, and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner, or syntax to instruct a computer to perform a certain operation segment. The instructions may be implemented using any suitable high-level, low-level, object-oriented, visual, compiled, and/or interpreted programming language.

In some aspects, the techniques described herein relate to a method including: receiving, from a generative artificial intelligence (AI) model, a set of AI-generated instructions that identifies steps for performing a task within an application; selecting checkpoint interactions from an interaction index that defines a plurality of interactions with a user interface of the application, each of the checkpoint interactions satisfying a similarity metric with a corresponding step in the set of AI-generated instructions; determining, based on detected user interactions with the user interface, a subset of the checkpoint interactions completed by a user within an observation period; evaluating a metric that quantifies user success with respect to performing the task, the metric depending at least in part on the subset of the checkpoint interactions completed by the user within the observation period; and based on the metric satisfying predefined criteria, performing a remedial action that is effective to increase a user success rate with respect to performing the task within the application.

In some aspects, the techniques described herein relate to a method, wherein the method further includes: receiving, through the user interface of the application, a query from the user pertaining to the task; prompting the generative AI model with an input that includes the query; and presenting the set of AI-generated instructions on a user interface.

In some aspects, the techniques described herein relate to a method, wherein identifying the checkpoint interactions includes: creating a vector representation of each step in the set of AI-generated instructions; creating a vector representation of each of the plurality of interactions in the interaction index; and for a select step in the set of AI-generated instructions: computing a cosine similarity or dot product between the vector representation of the select step and the vector representation of each of the plurality of interactions; and based on the cosine similarity or the dot product, identifying a select one of the plurality of interactions as most similar to the select step; and designating the select one of the plurality of interactions as one of the checkpoint interactions.

In some aspects, the techniques described herein relate to a method, wherein the method further includes: determining weights associated with each of the checkpoint interactions, wherein the metric is based on the weights, evaluating the metric includes computing a quality score, and the remedial action is taken in response to determining that the quality score satisfies low-quality criteria.

In some aspects, the techniques described herein relate to a method, wherein the task pertains to a topic and performing remedial action includes selectively transmitting the topic, the set of AI-generated instructions, and metadata identifying the detected user interactions to a team tasked with improving a quality of help resources available within the application.

In some aspects, the techniques described herein relate to a method, wherein performing the remedial action includes at least one of: automatically providing negative feedback to the generative AI model; instructing a technical support team to improve a help resource pertaining to the task that is accessible to the user within the application; or instructing the technical support team to modify a user interface within the application.

In some aspects, the techniques described herein relate to a method, wherein the task pertains to a topic and wherein preforming the remedial action includes generating a quality alert that identifies the topic.

In some aspects, the techniques described herein relate to a system including: an artificial intelligence (AI) content evaluation tool stored in memory and executable by a processor to: receive, from a generative artificial intelligence (AI) model, a set of AI-generated instructions that identify steps for performing a task within an application; select, from an interaction index that defines a plurality of user interface interactions, checkpoint interactions that each satisfy a similarity metric with a corresponding step in the set of AI-generated instructions. detect interactions between a user and a user interface of the application over an observation period; identify a subset of the checkpoint interactions completed by the user within the observation period; and evaluate a metric that quantifies user success with respect to performing the task, the metric depending at least in part on the subset of the checkpoint interactions completed by the user within the observation period; and transmit a quality alert in response to determining that the metric satisfies low-quality criteria.

In some aspects, the techniques described herein relate to a system, further including the application, wherein the application is configured to: receive, through the user interface, a query from the user pertaining to the task; and transmit a prompt based on the query to the generative AI model.

In some aspects, the techniques described herein relate to a system, wherein the AI content evaluation tool is further executable to: create a vector representation of each step in the set of AI-generated instructions; create a vector representation of each of the plurality of user interface interactions in the interaction index; and for a select step in the set of AI-generated instructions: compute a cosine similarity or dot product between the vector representation of the select step and the vector representation of each of the plurality of user interface interactions in the interaction index; and based on the cosine similarity or the dot product, identify a checkpoint interaction from the plurality of user interface interactions as corresponding to the select step, wherein the checkpoint interactions include the checkpoint interaction for the select step.

In some aspects, the techniques described herein relate to a system, wherein the metric depends, at least in part, on a number of the checkpoint interactions that the user successfully performs during the observation period.

In some aspects, the techniques described herein relate to a system, wherein the AI content evaluation tool is further executable to: create a ranking of the checkpoint interactions based on interaction frequency counts associated with a user interface element corresponding to each of the checkpoint interactions; based on the ranking, assign a set of weights to the checkpoint interactions, wherein the metric is based on the set of weights.

In some aspects, the techniques described herein relate to a system, wherein the task pertains to a topic and wherein the quality alert includes the topic, the set of AI-generated instructions, and metadata identifying the interactions detected over the observation period.

In some aspects, the techniques described herein relate to a system, wherein the quality alert is transmitted to a support team tasked with improving a quality of help resources available within the application.

In some aspects, the techniques described herein relate to a system, wherein the AI content evaluation tool is further configured to automatically provide negative feedback to the generative AI model in response to generating the quality alert.

In some aspects, the techniques described herein relate to one or more tangible computer-readable storage media encoding processor-executable instructions for performing a computer process, the computer process including: receiving, from a generative artificial intelligence (AI) model, a set of AI-generated instructions that identifies steps for performing a task within an application; selecting, from an interaction index that defines a plurality of interactions with a user interface of an application, checkpoint interactions that each satisfy a similarity metric with a corresponding step in the set of AI-generated instructions. determining, based on detected user interactions with a user interface of the application, a subset of the checkpoint interactions completed by a user within an observation period; and evaluating a metric that quantifies user success with respect to performing the task, the metric depending at least in part on the subset of the checkpoint interactions completed by the user within the observation period; and based on the metric satisfying predefined criteria, generate and transmit a quality alert that includes the set of AI-generated instructions and an input query that was used, by the generative AI model, as a basis for generating the AI-generated instructions.

In some aspects, the techniques described herein relate to one or more tangible computer-readable storage media, wherein the computer process further includes: receiving, from a user, the input query; prompting the generative AI model with the input query; and presenting the set of AI-generated instructions within a window of the application.

In some aspects, the techniques described herein relate to one or more tangible computer-readable storage media, wherein the computer process further includes: create a ranking of the checkpoint interactions based on interaction frequency counts associated with a user interface element corresponding to each of the checkpoint interactions; and based on the ranking, assign a set of weights to the checkpoint interactions, wherein the metric is based on the set of weights.

In some aspects, the techniques described herein relate to one or more tangible computer-readable storage media, wherein each of the plurality of interactions in the interaction index includes: an identifier that uniquely identifies a user interface element within the application; and a description of an action executed by the application that is triggered by a user input to the user interface element.

In some aspects, the techniques described herein relate to one or more tangible computer-readable storage media, wherein identifying the checkpoint interactions includes: creating a vector representation of each step in the set of AI-generated instructions; creating a vector representation of each of the plurality of interactions defined in the interaction index; for each of multiple steps in the set of AI-generated instructions: computing a cosine similarity or dot product between the vector representation of the step and the vector representation of each of the plurality of interactions; and based on the cosine similarity or the dot product, identifying a select interaction of the plurality of interactions that satisfies similarity criteria with the step. The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language. The above specification, examples, and data, together with the attached appendices, provide a complete description of the structure and use of exemplary implementations.

What is claimed is:

1. A method comprising:

receiving, from a generative artificial intelligence (AI) model, a set of AI-generated instructions that identifies steps for performing a task within an application;

selecting checkpoint interactions from an interaction index that defines a plurality of interactions with a user interface of the application, each of the checkpoint interactions satisfying a similarity metric with a corresponding step in the set of AI-generated instructions;

determining, based on detected user interactions with the user interface, a subset of the checkpoint interactions completed by a user within an observation period;

evaluating a metric that quantifies user success with respect to performing the task, the metric depending at least in part on the subset of the checkpoint interactions completed by the user within the observation period; and based on the metric satisfying predefined criteria, performing a remedial action that is effective to increase a user success rate with respect to performing the task within the application.

2. The method of claim 1, wherein the method further includes:

receiving, through the user interface of the application, a query from the user pertaining to the task;

prompting the generative AI model with an input that includes the query; and presenting the set of AI-generated instructions on a user interface.

3. The method of claim 1, wherein identifying the checkpoint interactions includes:

creating a vector representation of each step in the set of AI-generated instructions;

creating a vector representation of each of the plurality of interactions in the interaction index; and for a select step in the set of AI-generated instructions:

computing a cosine similarity or dot product between the vector representation of the select step and the vector representation of each of the plurality of interactions; and based on the cosine similarity or the dot product, identifying a select one of the plurality of interactions as most similar to the select step; and designating the select one of the plurality of interactions as one of the checkpoint interactions.

4. The method of claim 1, wherein the method further includes:

determining weights associated with each of the checkpoint interactions, wherein the metric is based on the weights, evaluating the metric includes computing a quality score, and the remedial action is taken in response to determining that the quality score satisfies low-quality criteria.

5. The method of claim 1, wherein the task pertains to a topic and performing remedial action includes selectively transmitting the topic, the set of AI-generated instructions, and metadata identifying the detected user interactions to a team tasked with improving a quality of help resources available within the application.

6. The method of claim 1, wherein performing the remedial action includes at least one of:

automatically providing negative feedback to the generative AI model;

instructing a technical support team to improve a help resource pertaining to the task that is accessible to the user within the application; or instructing the technical support team to modify a user interface within the application.

7. The method of claim 1, wherein the task pertains to a topic and wherein performing the remedial action includes generating a quality alert that identifies the topic.

8. A system comprising: a processing device including a processing system; an artificial intelligence (AI) content evaluation tool stored in memory and executable by the processing system to: receive, from a generative artificial intelligence (AI) model, a set of AI-generated instructions that identify steps for performing a task within an application; select, from an interaction index that defines a plurality of user interface interactions, checkpoint interactions that each satisfy a similarity metric with a corresponding step in the set of AI-generated instructions; detect interactions between a user and a user interface of the application over an observation period; identify a subset of the checkpoint interactions completed by the user within the observation period; and evaluate a metric that quantifies user success with respect to performing the task, the metric depending at least in part on the subset of the checkpoint interactions completed by the user within the observation period; and transmit a quality alert in response to determining that the metric satisfies low-quality criteria.

9. The system of claim 8, further comprising the application, wherein the application is configured to:

receive, through the user interface, a query from the user pertaining to the task; and transmit a prompt based on the query to the generative AI model.

10. The system of claim 8, wherein the AI content evaluation tool is further executable to:

create a vector representation of each step in the set of AI-generated instructions;

create a vector representation of each of the plurality of user interface interactions in the interaction index; and for a select step in the set of AI-generated instructions:

compute a cosine similarity or dot product between the vector representation of the select step and the vector representation of each of the plurality of user interface interactions in the interaction index; and based on the cosine similarity or the dot product, identify a checkpoint interaction from the plurality of user interface interactions as corresponding to the select step, wherein the checkpoint interactions include the checkpoint interaction for the select step.

11. The system of claim 8, wherein the metric depends, at least in part, on a number of the checkpoint interactions that the user successfully performs during the observation period.

12. The system of claim 8, wherein the AI content evaluation tool is further executable to:

create a ranking of the checkpoint interactions based on interaction frequency counts associated with a user interface element corresponding to each of the checkpoint interactions;

based on the ranking, assign a set of weights to the checkpoint interactions, wherein the metric is based on the set of weights.

13. The system of claim 8, wherein the task pertains to a topic and wherein the quality alert includes the topic, the set of AI-generated instructions, and metadata identifying the interactions detected over the observation period.

14. The system of claim 8, wherein the quality alert is transmitted to a support team tasked with improving a quality of help resources available within the application.

15. The system of claim 8, wherein the AI content evaluation tool is further configured to automatically provide negative feedback to the generative AI model in response to generating the quality alert.

16. One or more tangible computer-readable storage media encoding processor-executable instructions for performing a computer process, the computer process comprising:

receiving, from a generative artificial intelligence (AI) model, a set of AI-generated instructions that identifies steps for performing a task within an application;

selecting, from an interaction index that defines a plurality of interactions with a user interface of an application, checkpoint interactions that each satisfy a similarity metric with a corresponding step in the set of AI-generated instructions;

determining, based on detected user interactions with a user interface of the application, a subset of the checkpoint interactions completed by a user within an observation period; and evaluating a metric that quantifies user success with respect to performing the task, the metric depending at least in part on the subset of the checkpoint interactions completed by the user within the observation period; and based on the metric satisfying predefined criteria, generate and transmit a quality alert that includes the set of AI-generated instructions and an input query that was used, by the generative AI model, as a basis for generating the set of AI-generated instructions.

17. The one or more tangible computer-readable storage media of claim 16, wherein the computer process further includes:

receiving, from a user, the input query;

prompting the generative AI model with the input query; and presenting the set of AI-generated instructions within a window of the application.

18. The one or more tangible computer-readable storage media of claim 17, wherein the computer process further comprises:

create a ranking of the checkpoint interactions based on interaction frequency counts associated with a user interface element corresponding to each of the checkpoint interactions; and based on the ranking, assign a set of weights to the checkpoint interactions, wherein the metric is based on the set of weights.

19. The one or more tangible computer-readable storage media of claim 17, wherein each of the plurality of interactions in the interaction index includes:

an identifier that uniquely identifies a user interface element within the application; and a description of an action executed by the application that is triggered by a user input to the user interface element.

20. The one or more tangible computer-readable storage media of claim 17, wherein identifying the checkpoint interactions includes:

creating a vector representation of each step in the set of AI-generated instructions;

creating a vector representation of each of the plurality of interactions defined in the interaction index;

for a first step of multiple steps in the set of AI-generated instructions:

computing a cosine similarity or dot product between the vector representation of the first step and the vector representation of each of the plurality of interactions; and based on the cosine similarity or the dot product, identifying a select interaction of the plurality of interactions that satisfies similarity criteria with the first step.

* * * * *